United States Patent [19]
Weitzel et al.

[11] 3,731,850
[45] May 8, 1973

[54] DROPLET GENERATOR AND METHOD

[75] Inventors: William H. Weitzel, San Diego; Lee D. LaGrange, Del Mar, both of Calif.

[73] Assignee: Gulf Oil Corporation, San Diego, Calif.

[22] Filed: Jan. 14, 1972

[21] Appl. No.: 217,853

[52] U.S. Cl. ..................................222/193, 222/420
[51] Int. Cl. ..............................................B01d 47/02
[58] Field of Search.....................222/203, 214, 193, 222/420; 261/76, 78; 239/101, 330, 424

[56] References Cited

UNITED STATES PATENTS 3,482,544  12/1969  Verkaik...........................239/330 X

*Primary Examiner*—Stanley H. Tollberg
*Attorney*—William E. Anderson et al.

[57] ABSTRACT

A droplet generator and method for dispersing a liquid feed stock into uniform spherical droplets. The apparatus includes means for providing a jetstream of the liquid feed stock, means for generating uniformly periodic varicose instabilities in the jetstream, and means for providing a concurrent, coaxial flow of gas surrounding the jetstream in order to enhance the varicose instabilities in order to cause the uniform dispersion of the jetstream into uniform spherical droplets. It is desirable that the varicose instabilities have a wavelength of at least $\pi$ times the unperturbed diameter of the jetstream.

7 Claims, 4 Drawing Figures

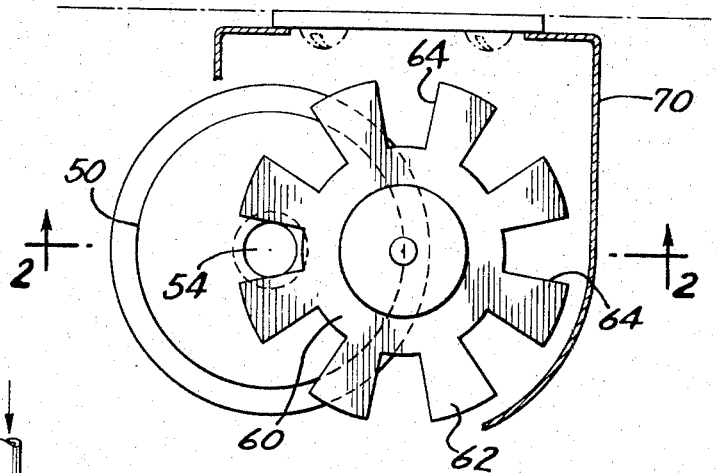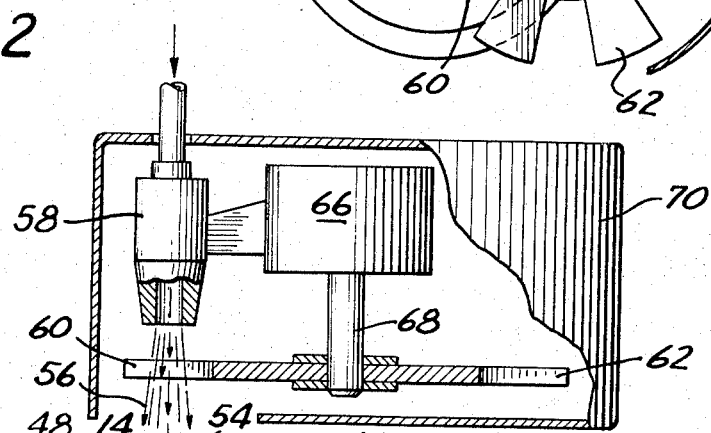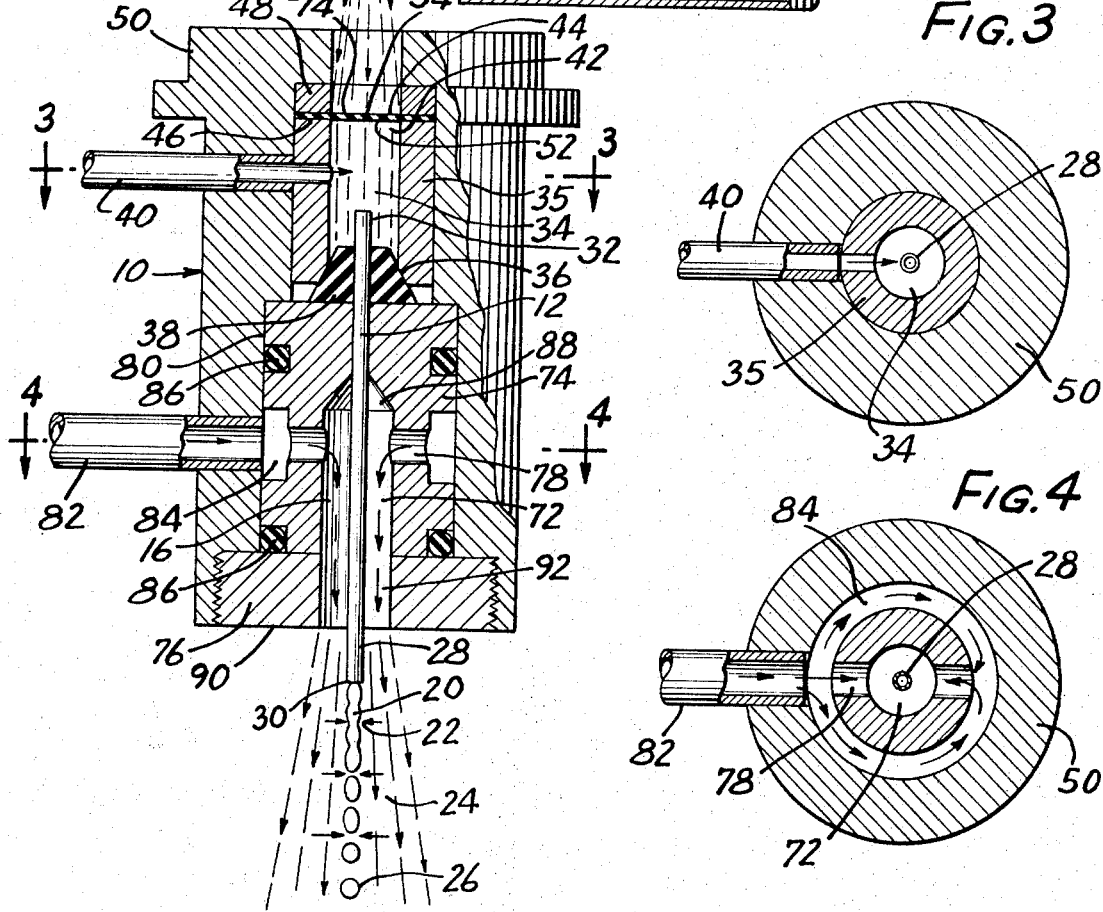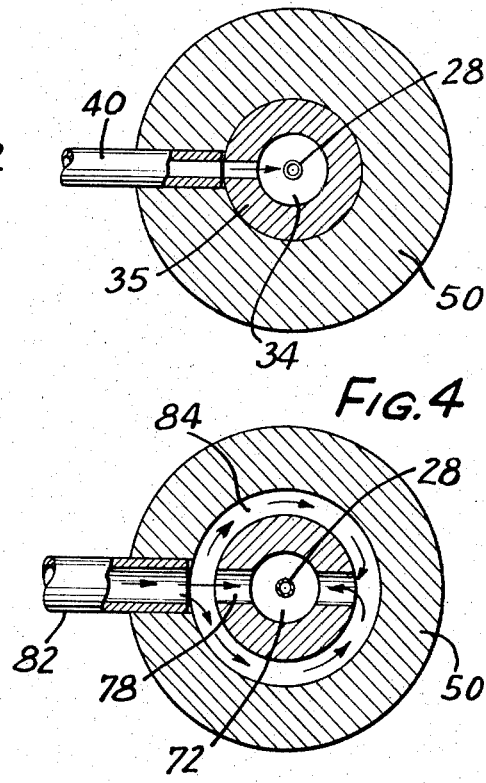

DROPLET GENERATOR AND METHOD

The present invention is directed to a method and apparatus for dispersing a liquid feed stock into liquid droplets. More particularly, the present invention is directed to such a method and apparatus for generating large numbers of small, uniform spherical droplets which are particularly suitable in the preparation of uniform, solid microspheres.

The provision of microspherical particles is important in various technical and industrial applications such as in the preparation of nuclear fuel for high-temperature, gas-cooled reactors and in the preparation of particulate catalyst materials used in petroleum refining and other chemical processes. It is desirable, and sometimes essential, that such microspheres be provided which are of a preselected uniform size, and which are of uniform, regular shape.

Microspherical particles are conventionally manufactured by dispersing a suitable liquid feed stock, containing dissolved or suspended material, into small droplets and subsequently solidifying the droplets in a suitable manner, such as by chemically gelling the droplets and/or evaporating or otherwise removing the solvent or liquid carrier from the droplets.

For example, oxide microspheres such as particulate nuclear fuel particles have commonly been made by the so-called "sol-gel" processes, wherein a fertile and/or fissionable material is prepared in the form of an aqueous sol liquid feed stock which is dispersed into small droplets which are subsequently dehydrated or otherwise treated under controlled conditions to produce form-stabilized gel particles. The form stable particles are then sintered to a high density and may be subsequently coated with a refractory material such as pyrolytic carbon. Processing of these droplets to a final spherical oxide particles is most efficiently carried out if the droplets are uniform in size and regular in shape.

The overall production rate of oxide microsphere particles is generally limited by the rate at which the liquid feed stock may be dispersed into droplets. Economical production of microspheres such as oxide fuel particles generally requires high rates of conversion of liquid into suitably sized droplets.

The quality and uniformity of dispersion of liquid feed stock to droplets is also generally the limiting factor with respect to the quality and uniformity of the finished oxide particles. Accordingly, it is desirable in the manufacture of uniform solid microspheres that the dispersion of liquid feed stock be carried out at a relatively high rate without sacrifice of droplet size uniformity or quality. However, obtaining high throughput rates from droplet generating devices generally has been associated with a wide range of droplet size, shape or quality. For example, droplet generators such as spray nozzles and spinning discs and bowls provide feed stock dispersion at a high throughput capacity, but produce an undesirably wide droplet size distribution.

Conversely, generally uniform droplets may be generated by relatively low capacity, monodispersive droplet generating devices which form and release individual droplets at a suitable orifice such as a capillary, either under the force of gravity or with the carefully adjusted coaxial flow of a second fluid. The production rate from such devices varies from less than a hundred droplets per minute for gravity induced droplet formation to about 2,000 droplets per minute for a well adjusted two-fluid nozzle. Increased droplet generation rates of about 20,000 droplets per minute with relatively good size uniformity may be achieved with vibrating capillary devices in which reciprocating motion at a preselected droplet generation frequency is imparted to the capillary incident to dispersion of the liquid feed stock. It is also known to introduce a stream or jet of feed stock solution into a quiescent zone of extraction solvent, in conjunction with a vibrator in the feed supply system.

However, known monodispersive droplet generating devices have not been completely satisfactory for the production of microspheres for various reasons such as relatively low production rates or lack of droplet uniformity.

Accordingly, it is an object of the present invention to provide an improved monodispersive droplet generating apparatus and method. It is a further object to provide a droplet generating apparatus and method capable of providing high production rates of uniformly sized droplets. It is a further object to provide a monodispersive droplet generating apparatus which is reliable and flexible in operation over a wide range of parameters such as selection of droplet size and production rate. It is still another object to provide an improved method and apparatus for continuously generating large numbers of small, uniform droplets in the production of oxide microspheres from a suitable sol, which process is economical and easy to control.

These and other objects of the invention are more particularly set forth in the following detailed description and in the accompanying drawing of which FIG. 1 is a top view, partially broken away, of a droplet generating device in accordance with an embodiment of the present invention;

FIG. 2 is a cross sectional side view of the droplet generating device of FIG. 1 taken through line 2—2;

FIG. 3 is a cross sectional view of the droplet generating device of FIG. 2 taken through line 3—3, and FIG. 4 is a cross sectional view of the droplet generating device of FIG. 2 taken through line 4—4.

Generally, the present invention is directed to a monodispersive droplet generating apparatus for dispersing a liquid feed stock into uniform spherical droplets. The droplet generator generally comprises means for providing a jet of the liquid feed stock, and means for generating uniformly periodic, varicose instabilities in the jetstream, which are alternate dilations and contractions in the jet which are generally radially symmetrical with respect to the jet axis. The droplet generator also includes means for providing a concurrent, coaxial flow of gas surrounding the jetstream to enhance these instabilities in order to cause the uniform breakup of the jet into uniform spherical droplets. The ratio of the wavelength of the varicose instabilities to the average diameter of the jet should best be within a particular range of values for most effective operation.

Illustrated in the drawings is a monodispersive droplet generating device 10 in accordance with an embodiment of the present invention. The droplet generator 10, illustrated in crosssection in FIG. 2, includes means 12 for providing a jetstream of the liquid feed stock to be dispersed into droplets, and means 14 for generating uniformly periodic varicose instabilities in the jetstream. The droplet generator 10 also includes means 16 for providing a concurrent coaxial flow of gas 24 surrounding the jetstream to enhance varicose instabilities 22 in the jetstream 20 in order to cause the uniform dispersion of the jetstream into uniform spherical droplets 26 of the liquid feed stock.

In the illustrated embodiment, the means 12 for providing the jetstream 20 comprises a tube 28 through which the liquid feed stock may be forced to provide the jetstream. The tube 28 in the device 10 may be a straight capillary cylinder having a constant uniform interior and exterior diameters throughout its length. Preferably, however, a reduction in pressure to force the jetstream through tube 28 and a marked increase in droplet production rate can be obtained by employing a tube having an internal diameter considerably larger than the desired capillary orifice diameter together with interchangeable inserts located at the distal end 30 to provide a multiplicity of selective and readily changeable orifice diameters. The distal end 30 of the capillary tube accordingly provides a suitable orifice from which the liquid feedstock may issue as a well defined jetstream 20 upon being forced through the capillary tube 28. The proximal end 32 of the capillary tube 28 is in fluid communication with a liquid feed stock reservoir chamber 34. The feed stock chamber 34 generally has a cylindrical shape defined by a cylindrical housing 35 which in the illustrated embodiment is constructed from a suitable material inert to the feed stock such as stainless steel. The cylindrical housing 35 is connected at one end 36 in a fluid tight manner with the capillary tube 28 by means of a resilient gasket 38 having the form of a truncated cone. As also illustrated in FIGS. 2 and 3, the capillary tube 28 penetrates the gasket 38 along its longitudinal axis, and the gasket and capillary tube are centered at the end 36 of the cylindrical housing 35 so that the capillary tube also lies along the longitudinal axis of the cylindrical liquid feed stock chamber 34. The resilient gasket 38 is held in compression against the end 36 of the cylindrical housing 35 to thereby provide a fluidtight seal both between the gasket and the housing, and between the gasket and the capillary tube 28.

The liquid feed stock chamber 34 is supplied with the liquid feed stock via supply tube 40 through the side of the cylindrical housing 35. The supply tube 40 also makes fluidtight communication with the reservoir chamber 34, and is in fluid communication with a source (not shown) of a suitable liquid feed stock. The liquid feed stock may be fed at a preselected uniform rate through the supply tube 40 into the chamber 34, and will then be forced through the capillary 28 to provide a jetstream 20 as it emerges from the orifice at the distal end 30 of the capillary.

In addition to serving as part of the fluid supply system to the capillary tube 28 from which the jetstream 20 exits the system, the reservoir chamber 34 also functions in the generation of uniform, periodic varicose instabilities in the jetstream. In this connection, the reservoir chamber 34 is sealed by means of a resilient membrane 44 at its end 42 which is opposite the end 36 of housing 35 adjacent the proximal end 32 of the capillary tube. The membrane 44 is constructed of a suitable flexible material such as polyethylene which is impervious to the liquid feed stock. In the illustrated embodiment, the resilient membrane is in the form of a thin circular disc having a diameter greater than the diameter of the cylindrical reservoir chamber 34. The flat resilient membrane is mounted so that it abuts the planar end 46 of the cylindrical housing 35 and is held in compressive relationship against the planar face 46 of the cylindrical housing by retainer ring 48. The retainer ring in turn abuts the outer body 50 of the droplet generator 10 along a direction longitudinal of the axis of the capillary tube 28 and the cylindrical reservoir chamber 34.

As is shown in FIG. 2, the interior surface 52 of membrane 44 forms one surface of the liquid feed stock reservoir chamber 34, while the exterior surface 54 of the membrane is exposed through a cylindrical cavity which is formed by the retainer ring 48 and the outer body 50 of the generator 10 and which is coaxial with the reservoir compartment 34. Because the membrane 44 is relatively flexible, it is capable of transmitting pressure pulses from its exterior surface 54 to the liquid feed stock contained in the reservoir compartment, and it will be seen that any pressure pulses so transmitted will be delivered to the jetstream of liquid feed stock as it issues from the orifice of the capillary tube 28 at its distal end 30. Such pressure pulses in turn will generate varicose instabilities in the jetstream 20. In the illustrated embodiment, the pressure pulses are produced by periodic impingement of a gas stream, such as an air jet, upon the exterior surface 54 of the membrane 44. Uniform periodicity is induced in the impinging gas stream by means of a shutter interposed between the membrane and the source of the gas stream. Uniform periodicity of the impinging gas stream, and consequently uniform periodicity of the pressure pulses transmitted to the fluid issuing from the capillary orifice will result in uniform periodicity in the varicose instabilities generated in the jetstream 20. In the illustrated embodiment, a continuous jet 56 of air or other gas is supplied by a nozzle 58. The nozzle 58 is in communication with a pressurized gas source (not shown) which may be regulated in a suitable manner to provide a desired, uniform flow rate through the nozzle. The nozzle is positioned coaxially with respect to the axes of the capillary tube 28 and the reservoir chamber 34, and the gas jet 56 is accordingly directed to provide orthogonal impingement upon the flexible membrane 44. In order to convert the steady gas jet 56 from the nozzle into a rapid and regularly periodic source of pressure pulses, a rotary shutter arrangement 60 is interposed between the nozzle 58 and the membrane 44. As best shown in FIG. 1, the rotary shutter 60 comprises a flat circular disc 62 which is rotatably mounted with an axis of rotation generally parallel to, but displaced laterally from, the axes of the nozzle 58, reservoir chamber 34 and capillary tube 28. The disc 62 has a plurality of generally rectangular notches 64 provided at regular intervals about its circumference, and as shown in FIGS. 1 and 2, the lateral displacement of the rotational axis of the notched disc 62 a distance somewhat less than the radius of the disc, provides for regularly periodic obstruction of the flow of gas from the nozzle 58 to the membrane 44 upon rotation of the notched disc at a uniform angular velocity. In this connection, the disc 62 is connected to a suitable motor 66 via mounting shaft 68 in order to provide for rotation of the disc at a desired, uniform velocity. The speed of motor 66 may be selected or regulated in any suitable manner. By appropriate choice of the number of notches 64 and the rotational speed of the disc, a very wide range of pulse frequencies may be provided. In addition, the total energy delivered to the membrane during each pulse may be varied by varying the delivery pressure of the gas jet 56 through the nozzle 58 and/or the width of the notches 64 in the disc 62. This capability of regulation of the gas-jet pulse frequency and strength provides for adjustment of the frequency and amplitude of the varicose instabilities generated in the liquid jet stream 20 for operation of the droplet generator. The nozzle 58 and notched disc 62 are enclosed within a housing 70 in order to contain the noise generated by the operation of the gas-jet, rotational shutter system.

The droplet generator also includes means 16 for providing a concurrent, coaxial flow of gas surrounding the jetstream 20 in order to enhance the varicose instabilities generated in the jetstream so as to cause the uniform dispersion of the liquid jetstream 20 into uniform spherical droplets. In this regard, the capillary tube 28 extends from the liquid feed stock reservoir chamber 34 through a cylindrical passageway 72 which is formed by the coaxial gas flow director 74 and packing nut 76. The cylindrical passageway 72 is coaxial with the capillary tube 28 and is in communication with a plurality of feed passageways 78 which penetrate through the coaxial flow director for supplying gas for the coaxial air flow.

As shown in FIGS. 2 and 4, the coaxial flow director 74 is generally cylindrical in shape and resides in a cylindrical recess 80 in the droplet generator body 50. A gas supply line 82 extends through the body 50 in communication with a manifold 84, recessed about the circumference of the coaxial flow director 74, which serves to distribute gas to the gas feed passageways 78. 0 ring seals 86 seal the gas supply system of the coaxial flow director.

The cylindrical passageway 72 should be of sufficient length to provide for a radially uniform flow of gas generally in a direction concurrent with the direction of flow of the liquid jetstream 20. The provision of plural gas feed passageways 78 into the cylindrical passageway 72 of the coaxial flow director 74 also aids in the establishment of a uniform flow of gas around the jetstream 20. The interior end 88 of the cylindrical passageway 72 is sealed, with the coaxial flow director 74 providing support for the capillary tube 28 at this point. The exterior end 92 of the cylindrical passageway is, of course, open and terminates at the exterior face 90 of the packing nut 76. The capillary tube 28 extends slightly beyond the exterior end 92 of the cylindrical passageway 72 so that the coaxial flow of gas from the passageway will be unconfined about the liquid jetstream 20 as it exits the capillary orifice. The packing nut 76 in the illustrated embodiment not only serves to define the terminal portion of the cylindrical passageway, but also functions to complete the assembly of various components of the droplet generator. The packing nut 76 maintains the coaxial flow director in compression against the gasket 38 which in turn is compressed and sealed against the cylindrical housing 35. The cylindrical housing 35 is similarly sealed against the membrane 44 and the retainer ring 48, which is seated against a flange in the outer body 50 of the generator 10.

In operating the droplet generator 10, a liquid feed stock is fed by a suitable mechanism at a uniform, preset flow rate through the liquid feed stock supply tube 40 into the liquid feed stock reservoir 34. Generally, this flow rate will be adjusted so that, in the absence of varicose instability generation and coaxial gas flow, a relatively smooth, laminar jetstream 20 will be delivered from the capillary tube extending a readily observable and appropriate distance beyond its orifice such as between about 1 and about 4 centimeters for capillary tubes having an inside diameter in the range of from about $400\mu$ to about $1,200\mu$.

Regular, varicose instabilities may be generated in the liquid jetstream 20 through the use of means 14. In this regard it is desirable that the varicose instabilities in the jetstream have a frequency such that the ratio of the instability wavelength to the unperturbed jetstream diameter be greater than about $\pi$ and preferably should be between about 4 and about 8. A ratio of about 4.5 is particularly desirable. By instability wavelength is meant the distance along the liquid jetstream between successive radial maxima or minima of the regularly periodic instability generated in the jetstream. For practical purposes, the unperturbed diameter of the jetstream may be referenced to the diameter of the capillary tube orifice.

A desired instability wavelength to unperturbed jetstream diameter may be established in any suitable manner. When the flow into the liquid chamber 34 has been adjusted to provide a smooth laminar jetstream, this flow rate may be measured and the jetstream velocity calculated from this value and the diameter of the capillary orifice. The rotational speed of the notched disc 62 may then be adjusted to provide the proper frequency of pressure pulse impingement from the gas nozzle 58 on the membrane 44 to result in the generation of regularly periodic varicose instabilities of the desired wavelength in the jetstream. The generation of varicose instabilities in the liquid jetstream through the provision of periodic pressure pulses is not sufficient to induce droplet formation of the desired uniformity or rate. A coaxial flow 24 of a gas such as air which is relatively inert to the liquid properties of the feed stock is provided by means 16 in order to enhance the instabilities to the point of uniform droplet formation. With the liquid flow rate and the instability frequency set but no coaxial gas flowing, the droplet production rate and size distribution will be relatively random. As the coaxial gas flow is begun and increased, an increasing fraction of uniform droplets are produced having an ideal volume equal to the volumetric flow rate of the liquid feed stock in the jetstream, divided by the instability frequency. At low coaxial gas flow rates there will be a significant fraction of droplets having volumes which are an integral multiple of the ideal droplet volume. As the coaxial gas flow rate is increased, the fraction of ideal size droplets will increase until essentially all of the droplets are uniform and ideal in volume. If coaxial gas flow is further increased, smaller droplets tend to appear and finally the liquid jetstream becomes an entrained spray consisting of a random distribution of very small droplets.

With reference to the embodiment of FIG. 2, it will be seen that the liquid jetstream forming capillary tube 28 extends somewhat, for example about 0.5 centimeter, beyond the coaxial gas flow orifice. Because of this geometry, the numerical velocity along the jetstream, which generally will exceed the velocity of the liquid jetstream, cannot be readily calculated, but rather may be controlled on a volumetric flow basis and may be readily adjusted to achieve the desired uniformity of breakup of the liquid jetstream. It should be pointed out that a coaxial gas flow without the generation of regular, periodic varicose instabilities therein will not produce a uniform dispersion of droplets at a high production rate. In general, when the coaxial gas flow is properly adjusted, one droplet will be formed for each wavelength of the varicose instability and accordingly the droplet formation rate will be approximately equal to the instability frequency and thus the frequency of the pressure pulses provided by the rotary shutter. As will be apparent to those skilled in the art in view of the present disclosure, very high instability frequencies and correspondingly high uniform droplet production rates may be achieved through the use of the present invention.

The properly adjusted coaxial gas velocity relative to the liquid jetstream velocity depends on the viscosity of the liquid feed stock and its surface tension. Jetstreams of liquid having a viscosity below about 25 centistokes are readily dispersed into uniform droplets with the illustrated embodiment of the present invention. When it is desired to solidify the uniform droplets and recover them as discrete, uniform particles as in the production of oxide microspheres, it is generally desirable for certain recovery procedures that the liquid feed stock have a viscosity above about 10 centistokes. The surface tension of liquid feed stock solutions is generally determined by their major components, and ordinarily may only be lowered by additives. Fluid viscosity is quite responsive to small additions of thickening agents and may be adjusted to a preselected value with such materials.

The following examples illustrate various features of the present invention.

EXAMPLE

A droplet generator similar to the embodiment illustrated in FIGS. 1, 2, 3 and 4 is provided which has a capillary tube about 3.6 cm. long with a 630 micron diameter orifice. The cylindrical passageway for the coaxial gas flow is about 1.1 cm. long and has a diameter of about 0.25 cm. The capillary tube extends about 0.6 cm. beyond the coaxial gas flow orifice of the packing nut. The liquid reservoir chamber has a volume of about 0.15 cm³ and the membrane is about 0.013 cm. (5 mil) thick and is constructed from polyethylene sheet stock. The circular membrane has an exposed diameter of about 0.5 cm. The rotary disc has 2 notches uniformly spaced about its circumference accounting for about 50 percent of the notched area of the disc, and is driven by a high speed electric motor. The continuous gas jet nozzle is located about 1 cm. away from the membrane, has an orifice diameter of about 0.16 cm. and is supplied with air at a pressure of about 60 psig. A thorium oxide sol having a viscosity of 25.5 centistokes and a density of 1.18 grams per cubic centimeter is fed into the liquid reservoir chamber and thence through the capillary at a uniform flow rate of 13 milliliters per minute to form a laminar jetstream with an unperturbed diameter of about 630 microns. The notched disc is activated to provide a pressure pulse rate of 14,000 pulses per minute which results in an instability wavelength to jetstream diameter ratio of 4.75. The ideal droplet diameter calculated for these parameters is 1,420 microns.

In order to demonstrate the effect of coaxial gas flow, three runs at these operating parameters are conducted with different coaxial flow rates of air supplied to the coaxial flow director. The droplets generated pass through a zone of gaseous ammonia where they are chemically gelled to a stable, shape retaining condition, and into an aqueous solution of ammonium hydroxide. The particles are then recovered for microscopic examination. Data for such runs are as follows:

| Run no. | Coaxial Air Rate (liters per minute) | Droplet diameter estimated by microscopic examination |
|---|---|---|
| 1 | 0 | large and variable |
| 2 | 9.2 | about 1210 microns and larger |
| 3 | 14.4 | about 1210 microns. |

EXAMPLE 2

In this example, a run similar to those of Example 1 is carried out with the following parameters:

| | |
|---|---|
| Liquid feed stock | a thorium oxide sol |
| Liquid feed stock viscosity | 11.1 centistokes |
| Liquid feed stock density | 1.18 g/cm³ |
| Feed stock flow rate | 23.4 ml/min |
| Capillary orifice diameter | 814 microns |
| Instability frequency | 12,250/min |
| Wavelength/diameter ratio | 4.5 |
| Ideal droplet diameter | 1540 microns |

The coaxial air flow is adjusted for uniform breakup of the jetstream and the droplets are gelled by passage through an atmosphere of ammonia into an aqueous solution of ammonium hydroxide. The gelled particles are then air dried, and a sample of the air dried particles are photomicrographed and their diameters measured. Within this sample, 99 percent of the sphere diameters are within the relatively narrow range of 599 ±43 microns.

EXAMPLE 3

A run is conducted similar to the run of Example 2 having the following parameters:

| | |
|---|---|
| Liquid feed stock | a thorium oxide sol |
| Liquid feed stock viscosity | 17.5 centistokes |
| Liquid feed stock density | 1.18 g/cm³ |
| Feed stock flow rate | 18 ml/min |
| Capillary orifice diameter | 630 microns |
| Instability frequency | 12,000/min |
| Wavelength/diameter ratio | 7.65 |
| Ideal droplet diameter | 1420 microns |

After gelling in ammonia and air drying, the particles are fired at a relatively low temperature and screened for size distribution:

Size Distribution After Low Temperature Firing (microns)

| Screen fraction | Weight percent |
|---|---|
| 175–295 | 0.4 |
| 295–494 | 90.4 |
| (420–490 by optical method) | |
| over 495 | 9.3 |

In this example a higher wavelength/diameter ratio than that used in Examples 1 and 2 is employed to demonstrate the ability to produce droplets of various sizes through variation of this ratio.

EXAMPLE 4

In this example, a run similar to that of Example 2 is carried out to demonstrate the use of a more complex liquid feed stock. The run has the following parameters:

| | |
|---|---|
| Liquid feed stock | a dispersion of carbon in a solution containing zirconyl and uranyl nitrates |
| Liquid feed stock viscosity | 17.8 centistokes |
| Liquid feed stock density | 1.06 g/cm³ |
| Feed stock flow rate | 13.8 ml/min. |
| Capillary orifice diameter | 630 microns |
| Instability frequency | 15,800/min |
| Wavelength/diameter ratio | 4.5 |
| Ideal droplet diameter | 1150 microns |

The gelled droplets produced in this run are uniformly 1,100 microns in diameter when measured optically. The gelled droplets may be used in the production of carbide microspheres in accordance with known procedures.

EXAMPLE 5

In this example, runs are carried out similar to Example 2 (except that the 2 notch disc is replaced with an 8 notch disc) at various droplet generating frequencies with the liquid feed rate varied to maintain the wavelength/diameter ratio at 4.5. The parameters of the runs are:

| | |
|---|---|
| Liquid feed stock | a uranyl nitrate solution |
| Liquid feed stock viscosity | 18 centistokes |
| Liquid feed stock density | 1.13 g/cm³ |
| Capillary orifice diameter | 342 microns |
| Wavelength/diameter | 4.5 |
| Ideal droplet diameter | 646 microns |

| Run no. | Liquid Feed flow rate (ml/min) | Instability frequency | Yield |
|---|---|---|---|
| 1 | 5.75 | 43,600 | High yield of ideal size |
| 2 | 12.7 | 88,000 | Good yield of ideal size some larger and smaller |
| 3 | 23. | 160,000 | Fair yield of ideal size many larger and smaller. |

Accordingly, it is seen that a droplet generator and method has been provided which is capable of producing liquid droplets of small diameter and very uniform size. The droplet production rate may be varied over a wide range from less than 10,000 per minute to more than 100,000 per minute.

As will be apparent to those skilled in the art, various modifications, adaptations and variations of the foregoing specific disclosure can be made without departing from the teachings of the present invention. Various features of the invention are set forth in the following claims:

What is claimed is:

1. A monodispersive droplet generating apparatus for dispersing a liquid feed stock into uniform spherical droplets, comprising, in combination, means for providing a jetstream of the liquid feed stock, means for generating uniformly periodic varicose instabilities in the jetstream, and means for providing a concurrent, coaxial flow of gas surrounding the jetstream to enhance the varicose instabilities in order to cause the uniform dispersion of the jetstream into uniform, spherical droplets.

2. A droplet generating apparatus in accordance with claim 1 wherein said jetstream providing means comprises a capillary tube.

3. A droplet generating apparatus in accordance with claim 2 wherein said means for providing a concurrent flow of gas for enhancing the varicose instabilities comprises means defining a passageway surrounding said capillary tube.

4. A droplet generating apparatus in accordance with claim 3 wherein said instability generating means comprises means defining a liquid feed stock chamber in fluid communication with said capillary tube, means for providing uniformly periodic pressure pulses, and means for transmitting pressure pulses from said pressure pulse means to liquid feed stock solution in said chamber.

5. A droplet generating apparatus in accordance with claim 4 wherein said transmitting means comprises a flexible membrane and wherein said means for providing pressure pulses comprises means for providing a continuous flow of gas directed at said membrane and rotary shutter means interposed between said means for providing a continuous flow of gas and said membrane for interrupting the flow of gas to said membrane at a predetermined uniform frequency.

6. A droplet generating apparatus in accordance with claim 1 wherein said means for providing varicose instabilities in said jetstream is capable of providing said instabilities at a frequency such that the wavelength of said instabilities in said jetstream is at least $\pi$ times the unperturbed diameter of the jetstream.

7. A process for dispersing a liquid into droplets of uniform size comprising the steps of providing a capillary jetstream of said liquid, generating uniformly periodic varicose instabilities in said jetstream having a wavelength of at least $\pi$ times the unperturbed diameter of said jetstream, and providing a concurrent, coaxial flow of gas surrounding the jetstream to enhance the varicose instabilities in order to cause the uniform breakup of the jetstream into uniform spherical droplets.

\* \* \* \* \*